Nov. 29, 1955  G. F. DURON  2,725,082
BONEDUST COLLECTOR FOR BUTCHER'S BAND SAWS
Filed July 26, 1954
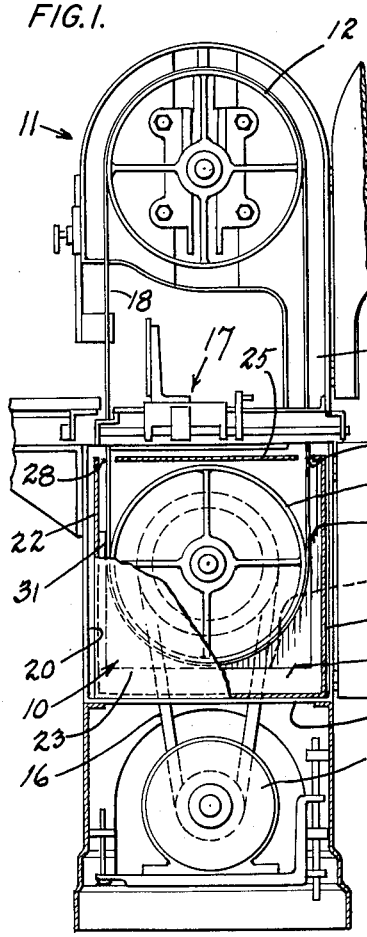
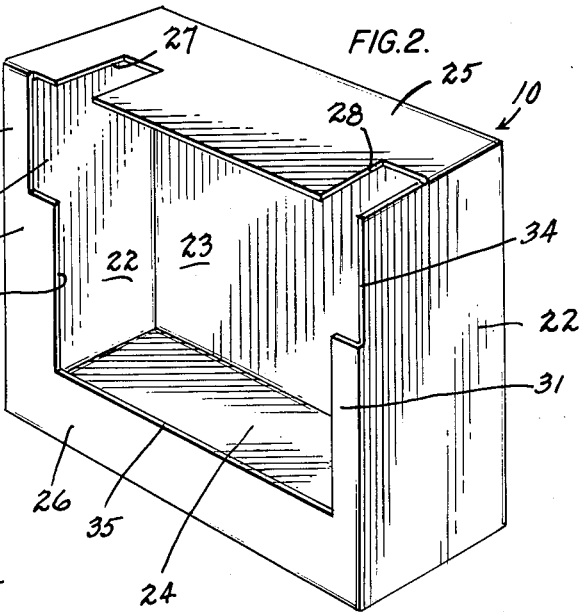
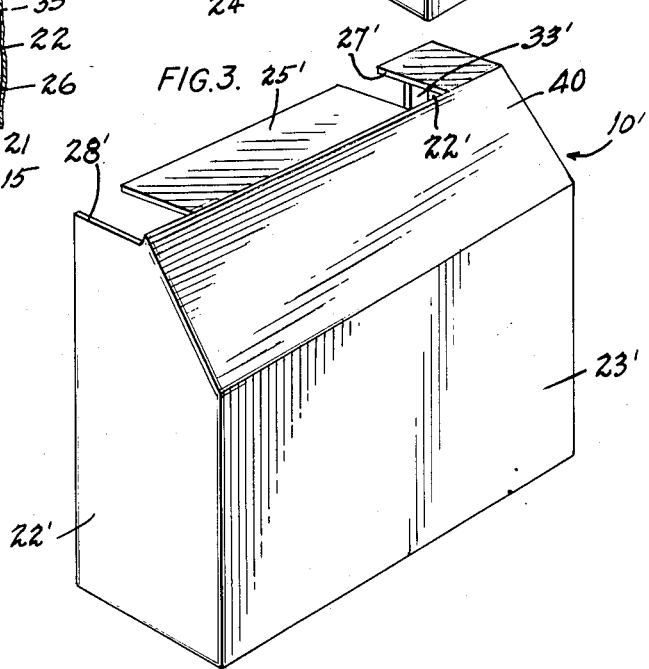
GILBERT FELIZ DURON,
INVENTOR.
BY *C. G. Stratton*
ATTORNEY.

__2,725,082__

__BONEDUST COLLECTOR FOR BUTCHER'S BAND SAWS__

Gilbert Feliz Duron, Los Angeles, Calif.

Application July 26, 1954, Serial No. 445,501

2 Claims. (Cl. 143—17)

The present invention relates generally to a dust collecting device and relates more specifically to a device for use in conjunction with a butcher's band saw, or the like for collecting bonedust collected by the blade of such saw.

It is a general practice of butchers and meat cutters to sever meat with a knife or the like and then utilize band or other types of saws for cutting through bone structures. In cases where the more efficient band saws are utilized, and where considerable bone cutting must be accomplished, a serious problem has existed as to the collection of the bonedust carried from the bone structures by the saw blade inasmuch as blades in this type of cutting device generally travel about pulleys with centrifugal action serving to throw the bonedust from the blade. In prior butchers' band saws, it has been the practice to provide a shallow pan beneath a pulley supporting the lower end of a saw blade and to rely upon mere gravitational forces for disposition of the bonedust in this tray or pan. These prior devices have not always been satisfactory inasmuch as considerable bonedust is collected on the surface of a blade supporting pulley and carried about the pulley by the saw blade. The bonedust then deposited on the blade and pulley has heretofore been thrown centrifugally about the various wall portions of a lower pulley enclosing chamber, into remote corners thereof and about numerous fittings, bolts, nuts and other components of the saw.

Accordingly, it is a principal object of the present invention to provide novel means for collecting bonedust resulting from use of a butcher's band saw.

Another object of the present invention is to provide a bonedust collecting device for use with a butcher's band saw that is removable from the saw in order that the collected bonedust may be disposed of and the collecting device cleansed for further use.

A further important object of the present invention is to provide a novel box-like bonedust collecting device for use with a butcher's band saw, having features enabling the close confining of a saw blade and supporting pulley in order that all accumulated bonedust may be effectively collected.

The invention also has for its objects to provide such a bonedust collecting device that is positive in operation, convenient in use, easily installed in a working position and easily disconnected or removed therefrom, economical in maufacture, relatively simple, and of great superiority and serviceability.

The invention also comprises novel details of construction and novel combinations and arrangements of parts which will more fully appear in the course of the following description. However, the drawing merely shows and the following description merely describes preferred embodiments of the present invention, which are given by way of illustration for example only.

With reference to the drawing:

Fig. 1 is a side elevational view of a butcher's band saw with doors and covers in an open position to illustrate the use of the device of the present invention;

Fig. 2 is a rear perspective view of the bonedust collecting device of the present invention; and Fig. 3 is a front perspective view of a modified form of bonedust collecting device of the present invention.

In the drawing, like reference characters designate similar parts in several views. The bonedust collecting device of the present invention is shown in Fig. 2, as indicated generally at 10. The device is adapted for use with a butcher's type of band saw, indicated generally at 11, and including upper and lower pulleys 12 and 13, respectively. The pulleys 12 and 13 are supported on a suitable frame 14, with the pulley 13 being driven as by a motor 15 and a belt 16. A cutting table 17 is associated with the band saw 11, through which a saw blade 18 travels in its passage about the pulleys 12 and 13. A compartment or chamber 20 is provided in the lower end of the band saw 11, with this compartment surrounding the pulley 13 and lower regions of the band saw 18. As will be hereinafter more fully described, the bonedust collecting device 10 is adapted for disposition in the chamber 20 and adapted to rest upon a transverse partition 21, defining the lower extremities of the chamber 20.

With reference primarily to Fig. 2, the bonedust collecting device 10 comprises a box-like pan having planar sides 22, a planar front panel 23 and a planar bottom panel 24. The front panel 23 is substantially wider than the side panels 22, thereby creating a substantially rectangular box-like structure. The collecting device 10 further is provided with a top panel 25 and a rear panel 26. The top panel 25 is provided with spaced cutouts 27 and 28 for a purpose to be hereinafter more fully described. Additionally, the rear panel 26 is provided with an enlarged cutout 30 that extends to the rearward edge of the top portion 25 and communicates with the cutouts 27 and 28. A pair of flaps 31 and 32 are formed in conjunction with the cutout 30. Additionally, the cutout 30 is spaced as indicated at 33 from one of the sides 22 while the other side of the cutout 30 is terminated as at 34 along a rearward edge of the other side 22.

In use of the present bonedust collecting device, the lower edge 35 of the cutout 30 is inserted to slide under the lower edge of the lower pulley 13, with the cutouts 27 and 28 being adapted for reception on the saw blade 18 extending to and from the pulley 13. It is to be noted that the flaps 31 and 32 extend beyond the normal position of the band saw blade 18 and that the remaining portions of the rear panel 26 surrounding the cutout 30 effectively cover the area immediately beyond the periphery of the lower pulley 13 and saw blade 18 traveling thereabout. It is to be noted that the cutouts 27 and 28 closely confine the blade 18 so as to prevent undue throwing of the bonedust from the collecting device. As bonedust is carried from the table 17 downwardly into the chamber 20, this dust will be moved, as by the blade 18, about the periphery of the pulley 13 and will be thrown as by centrifugal force into the collecting device 10, thereafter to be trapped therein.

At regular intervals, the collecting device 10 may be removed from the compartment 20 to be emptied and cleansed for replacement and later use. The manner of removal of the collecting device 10 is in the reverse of the aforementioned manner of placement in the compartment 20.

In Fig. 3, a modified form of the invention is shown, wherein like parts are indicated by like single primed reference numerals. In this arrangement, a beveled portion 40 is provided intermediate the top portion 25' and the rear portion 23'. With this particular arrangement, the angular disposition of the portion 40 not only permits bonedust that might collect thereon to move at an angle downwardly and drop into the lower chamber about the collecting device 10′, but also permits use of the present bonedust collecting device in conjunction with various types of butchers' band saws having obstructions in the area cut off by the beveled portion 40.

While I have illustrated and described what I now contemplate to be the best modes of carrying out my invention, the constructions are, of course, subject to modifications without departing from the spirit and scope of the invention. It is, therefore, not desired to restrict the invention to the particular forms of construction illustrated and described, but to cover all modifications that may fall within the scope of the appended claims.

Having thus described the invention, what I claim and desire to secure by Letters Patent is:

1. A bonedust collecting pan comprising: planar sides, front and bottom portions, said front portion being of a width greater than said side portions; a top portion, said top portion having a pair of spaced cutouts, a rear portion having an enlarged cutout, said cutouts in said top and rear portions communicating with each other; and peripheral side flaps in said rear portion adjacent said cutout therein, said flaps extending upwardly and being terminated remote from a rearward edge of said top portion.

2. A combination butcher's band saw and bonedust collecting device comprising: a saw frame and housing; upper and lower pulleys; means for rotatably supporting said pulleys; means for driving said pulleys; a lower pulley chamber formed in said housing about said lower pulley; a meat supporting table disposed adjacent an upper end of said chamber; band saw blade disposed about said pulleys and through said table; a rectangular box-like substantially enclosed pan adapted for disposition in said chamber about said lower pulley and said blade; planar sides, front and bottom portions on said pan, said front portion being of a width greater than said side portions; a top portion on said pan, said top portion having a pair of spaced cutouts adapted for reception of said blade at points above said lower pulley and closely confining three sides of said blade; a rear portion on said pan, said rear portion having an enlarged cutout, said cutouts in said top and rear portions communicating with each other; and peripheral inwardly directed flaps on said rear portion adjacent said cutout therein, said flaps extending upwardly and being terminated remote from a rearward edge of said top portion.

References Cited in the file of this patent

UNITED STATES PATENTS

| | | |
|---|---|---|
| 360,762 | Day | Apr. 5, 1887 |
| 562,042 | Shaw | June 16, 1896 |
| 2,492,824 | Ahrndt et al. | Dec. 27, 1949 |
| 2,585,957 | Meeker et al. | Feb. 19, 1952 |